United States Patent [19]

Profant et al.

[11] Patent Number: 4,834,693
[45] Date of Patent: May 30, 1989

[54] HYBRID DRIVE SHAFT

[75] Inventors: Daniel D. Profant, West Harwich, Mass.; Jeremy J. Walters, San Diego, Calif.

[73] Assignee: Avco Corporation, Providence, R.I.

[21] Appl. No.: 87,975

[22] Filed: Aug. 17, 1987

Related U.S. Application Data

[60] Continuation-in-part of Ser. No. 308,304, Oct. 5, 1981, abandoned, Division of Ser. No. 163,037, Jun. 26, 1980, abandoned.

[51] Int. Cl.$^4$ .................................................. F16C 3/02
[52] U.S. Cl. ..................................... 464/183; 428/608; 464/902
[58] Field of Search .......................... 138/142, 143; 415/212 A; 416/241 R; 428/594, 608, 611, 614, 651, 653, 660; 464/179, 181, 183, 902, 903

[56] References Cited

U.S. PATENT DOCUMENTS

| 3,466,895 | 9/1969 | Cartwright | 464/183 X |
|---|---|---|---|
| 3,849,080 | 11/1974 | Zechmeister | 428/608 X |
| 3,862,489 | 1/1975 | Weisinger | 228/193 X |
| 3,871,834 | 3/1975 | Kuniya et al. | 428/611 X |
| 3,890,690 | 6/1975 | Li | 428/611 X |
| 3,936,277 | 2/1976 | Jakway et al. | 428/608 |
| 3,938,964 | 2/1976 | Schmidt | 138/143 |
| 4,173,670 | 11/1979 | VanAuken | 464/183 X |
| 4,272,971 | 6/1981 | Loyd et al. | 464/183 X |
| 4,318,280 | 3/1982 | Williams | 464/183 X |

OTHER PUBLICATIONS

Mechanical Engineering, "Low-Cost High Performance Carbon Fibers", William E. Chambers, pp. 37-41, Dec. 1975.
Machine Design, "Advanced Fiber-Resin Composites", Kenneth R. Berg et al., pp. 2-10, Apr. 1, 1971.

Primary Examiner—Daniel P. Stodola
Attorney, Agent, or Firm—Perman & Green

[57] ABSTRACT

A high specific modulus shaft for use in a dynamic assembly such as a gas turbine engine is constructed having a metal outer tubular shaft to transmit the torque and an interior shaft constructed of a metal and high modulus filament composite material bonded to the inner diameter of the outer shaft. The outer shaft may be constructed of steel or titanium or superalloy such as Inconel 718. The inner shaft may be constructed of an aluminum matrix in which multiple boron filaments are embedded in axial alignment or of a titanium matrix in which boron filaments coated with silicon carbide or boron carbide are similarly embedded.

9 Claims, 1 Drawing Sheet

HYBRID DRIVE SHAFT

This is a continuation-in-part of co-pending application Ser. No. 308,304, filed on Oct. 5, 1981, now abandoned, which is a division of application Ser. No. 163,037 filed June 26, 1980, now abandoned.

BACKGROUND OF THE INVENTION

One persistent trend in the gas turbine industry is the development of smaller, more efficient engines with increased specific power. These changes invariably result in correspondingly higher speed and stress levels on the principal engine components. An engine drive or power shaft is a prime example of this condition since the combination of increased rotor speed and smaller shaft diameter create critical speed problems. One solution is to decrease the effective shaft length by adding additional bearing supports. This creates added mechanical complexities to achieving and assemblying a smaller engine. A simpler and more practical solution to the problem is to construct shafts with higher modules to density ratio which will result in an increased specific stiffness and critical speed.

SUMMARY OF THE INVENTION

A combined metal and composite drive shaft hereafter jointly referred to as a hybrid drive shaft, is constructed to withstand the torsional and bending stresses placed on a small diameter drive shaft for a gas turbine engine. First, an outer tubular steel shaft is constructed. Then according to one embodiment of the invention, boron filaments are carefully positioned and spaced between two thin film layers of aluminum to form an aluminum sheet having interior longitudinally oriented boron filaments. The boron/aluminum sheet is rolled onto a mild steel mandrel and inserted into the tubular steel shaft with the filaments aligned axially. The assembly is placed in an autoclave which is first pressurized to 4–5 ksi, heated to 960° F. and then subjected to an increased pressure of 10 ksi for a half hour. This process results in a fully consolidated hybrid drive shaft having a tubular steel outer shaft and an aluminum inner shaft reinforced by axially aligned boron filaments to enhance bending stiffness.

A pertinent prior art reference is the U.S. Pat. No. 3,862,489, to Weisinger, which discloses a method of fabricating high strength composite tubular structures. The end product of the Weisinger method is stated to be an excellent choice for tubular truss elements loaded unidirectionally. In contrast, a hybrid drive shaft constructed in accordance with the invention is intended for use in a dynamic assembly, most notably, a gas turbine engine. It is intended to withstand high torsional loads, which are sometimes intermittent, at elevated temperatures. Such a shaft must exhibit high shear strength. These features result from the load sharing which occurs between the outer metal shaft and the inner composite shaft.

DESCRIPTION OF THE DRAWING

This invention is described in more detail below with reference to the drawing in which.

DETAILED DESCRIPTION OF THE PREFERRED EMBODIMENT

Figure 1:
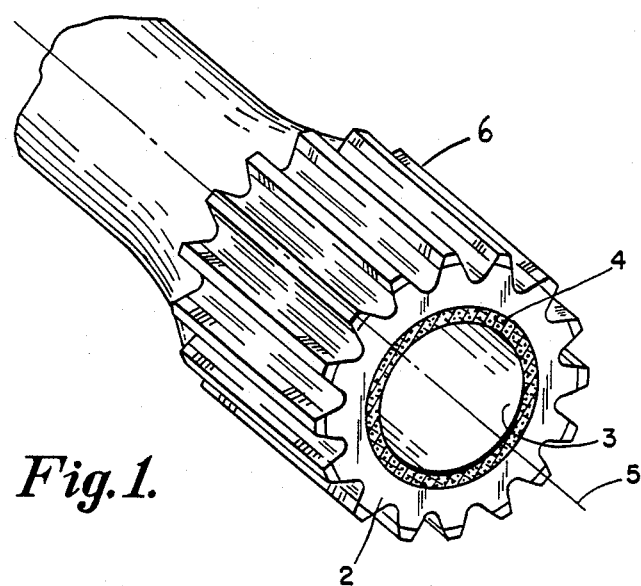
FIG. 1 is a perspective view of one end of the fabricated shaft.
Figure 2:
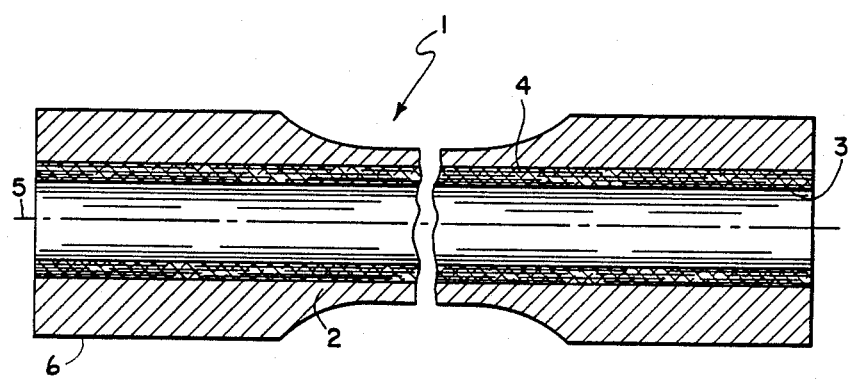
FIG. 2 is a sectional view taken along a longitudinal plane through the axis.

A completed hybrid drive shaft 1 constructed according to this invention is shown in FIGS. 1 and 2 and consists of a hardened steel tubular outer shaft 2 including hardened spline 6 to which is bounded on its inner diameter a high specific modulus layer 3. In alternative constructions, the outer shaft 2 may be composed of titanium or a high temperature superalloy, for example, IN718. The layer 3 as best seen in FIG. 2 consists of a fully consolidated aluminum matrix in which multiple boron filaments 4 are imbedded in general alignment with axis 5.

The layer 3 consists of 7 mil thick aluminum matrix tape with 5.6 mil boron filaments sandwiched inside. A titanium tape could also be used, but in that instance silicon carbide or boron carbide coated boron filaments should be used to prevent interaction between the titanium and boron.

The layer 3 is rolled onto a mild steel mandrel and is inserted into the tubular steel shaft 2. This assembly is then placed into an autoclave in which the pressure is then raised to an intermediate pressure of 4 to 5 ksi. By raising the temperature at this point to 960° F. the ductility of the layer 3 and its mandrel are increased to facilitate the initial stages of bonding. As a final step, the pressure is then elevated to 10 ksi and held for approximately a half hour to allow complete consolidation. The mandrel is then removed through a chemical milling process.

The outer shaft 2 can be constructed of either steel or titanium or super alloy to insure torsional integrity of the composite hybrid drive shaft. A typical shaft 1 could have a steel or titanium or super alloy outer shaft having an outside diameter of 1 inch and an interior diameter of 0.625 inch with a 0.070 inch thick boron-/aluminum layer 3 bonded at the interior diameter.

In this manner a hybrid drive shaft is constructed having a high specific modulus which provides a greater critical speed. Since the outer surface is constructed of steel or titanium or high temperature super alloy, it may be machined or welded as required.

To avoid the use of an autoclave, the assembly of the shaft and mandrel may be sealed and evacuated. The assembly could then be pressurized through an internal axial passage within the mandrel. By pressurizing under high temperature consolidation and diffusion, bonding of the tape and the tape to the outer shaft can be assured.

While the invention has been described with respect to specific embodiments thereof, it is understood that alternatives may occur to those skilled in the art. The invention, therefore, should be limited only by the scope of the claims appended hereto.

We claim:

1. A hybrid rotatable drive shaft for use in a dynamic assembly such as a gas turbine engine comprising:
    an outer tubular shaft of predetermined length constructed of machinable high torsion resistant metal and having an interior axially extending passage; and
    an interior shaft constructed of a metal matrix containing axially aligned filaments of a high modulus of elasticity material, said interior shaft being substantially coextensive lengthwise with said outer tubular shaft and being permanently and completely consolidated and bonded on the inner diameter of said outer tubular shaft to reinforce the bending strength of said outer tubular shaft;

wherein said resulting hybrid rotatable drive shaft has a high specific modulus of elasticity and is capable of withstanding high torsional, intermittent loads at elevated temperatues.

2. A hybrid drive shaft as described in claim 1 wherein said outer tubular shaft is constructed of titanium.

3. A hybrid drive shaft as described in claim 1 wherein the metal matrix is aluminum.

4. A hybrid drive shaft as described in claim 1 wherein the metal matrix is titanium.

5. A hybrid drive shaft as described in claim 1 wherein the axially aligned filaments are constructed of boron.

6. A hybrid drive shaft as described in claim 1 wherein said outer tubular shaft is constructed of steel.

7. A hybrid drive shaft as described in claim 1 wherein said outer tubular shaft is constructed of high temperature superalloy.

8. A hybrid drive shaft as described in claim 1 including coupling means at both ends of said outer tubular shaft to mechanically interconnect said shaft into the drive of the gas turbine engine.

9. A hybrid drive shaft as described in claim 8 wherein said coupling means includes hardened splines.

* * * * *